United States Patent [19]

Kirby et al.

[11] 3,714,576

[45] Jan. 30, 1973

[54] SEISMIC RADIO TELEMETRY SYSTEM

[75] Inventors: Robert A. Kirby, Houston, Tex.; Billy J. Propst, Houston, Tex.

[73] Assignee: Esso Production Research Company

[22] Filed: April 1, 1971

[21] Appl. No.: 130,147

Related U.S. Application Data

[63] Continuation-in-part of Ser. No. 847,315, Aug. 4, 1969, abandoned.

[52] U.S. Cl. ....................325/61, 340/205, 340/188, 325/113

[51] Int. Cl. ............................................G08c 19/16

[58] Field of Search......340/177, 188, 203, 205, 209; 325/61, 62, 113, 311; 330/29, 124, 127; 333/14, 17

[56] References Cited

UNITED STATES PATENTS

| | | | |
|---|---|---|---|
| 1,778,077 | 10/1930 | Holden | 340/205 X |
| 2,776,365 | 1/1957 | White | 325/311 |
| 3,320,364 | 5/1967 | Steiner et al. | 178/67 |
| 3,325,778 | 6/1967 | Ballard | 340/7 |
| 3,377,559 | 4/1968 | Stewart | 325/61 |

*Primary Examiner*—Benedict V. Safourek
*Attorney*—James A. Reilly, John B. Davidson, Lewis H. Eatherton, James E. Gilchrist, Robert L. Graham and James E. Reed

[57] ABSTRACT

The output signal of a stepped gain amplifier is transmitted through a communications link (e.g., a radio link) by modulating a clock signal and varying a characteristic of the signal upon each gain change of the amplifier. The modulated clock signal is detected to produce an output signal indicative of the amplified output signal, and the variation in the characteristic is also detected to produce a signal indicative of gain changes. Preferably, a half cycle of the clock is eliminated upon each gain change to produce the gain change indication. A positive half cycle is eliminated for a gain variation in one sense and a negative half cycle is eliminated upon a gain change in the other sense.

2 Claims, 19 Drawing Figures

INVENTORS
ROBERT A. KIRBY
BILLY J. PROPST
BY John B. Davidson
ATTORNEY

INVENTORS
ROBERT A. KIRBY
BILLY J. PROPST
BY John B Davidson
ATTORNEY

ROBERT A. KIRBY INVENTORS
BILLY J. PROPST

BY John B Davidson

ATTORNEY

ROBERT A. KIRBY INVENTORS
BILLY J. PROPST

BY John B Davidson
ATTORNEY

SEISMIC RADIO TELEMETRY SYSTEM

REFERENCE TO RELATED APPLICATION

This application is a continuation-in-part of U.S. Application Ser. No. 847,315 filed Aug. 4, 1969, by Robert A. Kirby and Billy J. Propst for "Seismic Radio Telemetry System" and now abandoned.

BACKGROUND OF THE INVENTION

This invention relates to the remote recording of electrical data signals, particularly signals having wide amplitude variations such as the output signals of seismic detectors used in connection with seismic prospecting.

It is well known that geophone output signals when used in connection with seismic prospecting have wide amplitude variations. Generally speaking, the geophone output signal will be of extremely large amplitude when first arrivals from the seismic disturbance are detected thereby, and the amplitude will rapidly decay as a function of time from the instant of the seismic disturbance producing the seismic waves. In recent years, digital recording of seismic signals has gradually become standard practice and stepped gain seismic signal amplifiers have become increasingly popular. Such stepped gain systems usually have gain steps in accordance with a binary gain program, each gain step being proportional to a power of two. The systems change in gain whenever the output signal thereof remains outside of predetermined limits for a predetermined period of time. A binary gain seismic amplifier is described in U.S. Pat. No. 3,308,392 - McCarter, and in U.S. Pat. No. 3,315,223 - Hibbard et al.

In marine seismic surveying it is not infrequently desirable to station a seismic wave detector on a buoy, and to record the detector output signals aboard a ship which may be a considerable distance away from the buoy. It is therefore necessary to transmit the output signals of the seismic detector to the recording location (i.e., the ship) by means of a communications link, such as a radio link. When a stepped gain amplifier is used at the seismic detector location, manifestly it is necessary to transmit not only the amplitude to the electrical signal at the output of the amplifier but also an indication of the gain of the amplifier, or an indication of the instant at which the gain of the amplifier changes responsive to the amplitude of the seismic signal at the input of the amplifier. While this can be done by transmitting the seismic amplifier output signal to the recording location on one radio channel and transmitting the amplifier gain information to the recording location on another channel, such would be very wasteful of radio frequencies and of electrical power. Therefore, it is preferable to transmit gain information and amplitude information on the same radio communications link.

SUMMARY OF THE INVENTION

In accordance with the present invention, the output data signal of a variable gain amplifier having a plurality of gain steps and which is adapted to automatically change gain when the amplitude of the output data signal thereof remains outside of predetermined limits, is transmitted to a remote location over a communications link by producing a clock signal, modulating the clock signal in accordance with variations in amplitude of the data signal, varying a characteristic of the clock signal upon a change in gain of the amplifier, transmitting the modulated clock signal through a communications link, at the receiving end of the link detecting variations in amplitude of the modulated clock signal, further detecting variations in said characteristic of the clock signal, producing electrical signals indicative of the detected amplitude variations, producing an electrical signal upon each detection of a variation in a characteristic of the detected signal, and concomitantly recording the two electrical signals thus produced.

Objects and features of the invention not apparent from the above discussion will become evident upon consideration of the following detailed description thereof in connection with the accompanying drawings, which is to be taken as being in the nature of and example, and not in a limiting or restrictive sense.

BRIEF DESCRIPTION OF THE DRAWINGS

In the drawings:

FIGS. 5A–50 illustrate a number of wave forms such as will be produced at various points in the circuits of FIGS. 1 and 2, which are useful in understanding the operation of the apparatus of FIGS. 1 and 2.

DESCRIPTION OF THE PREFERRED EMBODIMENT

Figures 1, 2:
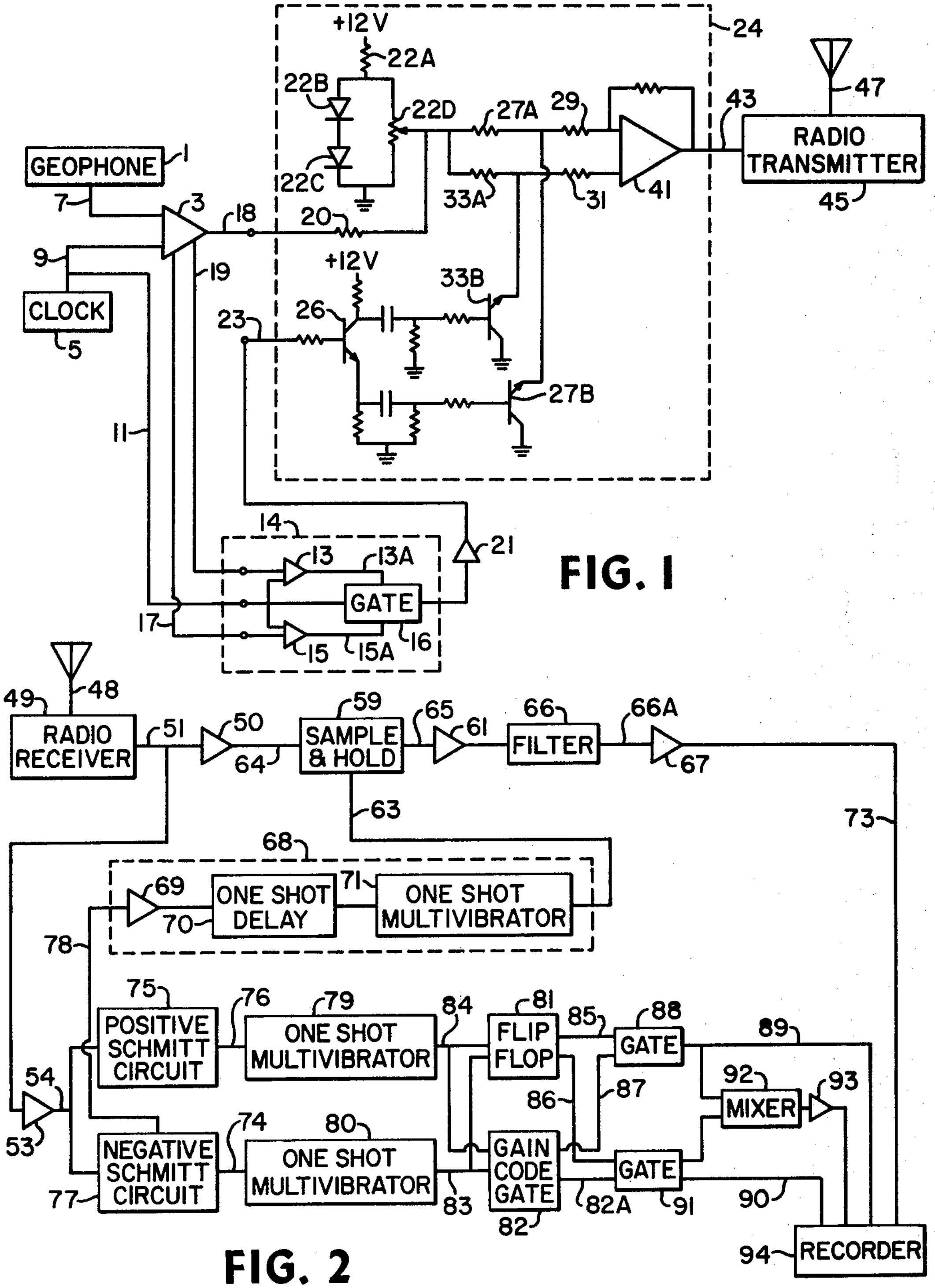
FIG. 1 is a schematic representation of apparatus for transmitting a seismic detector output signal as amplified by a stepped gain amplifier, in accordance with the invention.
FIG. 2 is a schematic electrical diagram of suitable apparatus for use at a recording location to detect the signal transmitted from the remote location by the apparatus of FIG. 1, in accordance with the invention.

With reference now to FIG. 1, there is illustrated apparatus such as may be located on a marine buoy, or at other locations at which a data signal having widely varying amplitude ranges is produced for transmission to another location by a communications link. The radio transmitter 45 and associated antenna 47, and the radio receiver 49 and associated antenna 48 (illustrated on FIG. 2) will be assumed to provide the communications link in the embodiment of the invention described herein. The seismic pickup 1, which may be a geophone, hydrophone, or other suitable apparatus for producing an electrical signal responsive to detection thereby of seismic waves or other physical phenomenon to be measured, is coupled to a binary gain amplifier 3 by means of a line 7. The binary gain amplifier may be a device such as is illustrated and described in U. S. Pat. No. 3,308,392 - McCarter. This amplifier varies in gain, either in a positive or negative direction, whenever the amplitude of an input signal coupled thereto on line 7 varies outside of predetermined limits, so that the amplifier output signal appearing on line 18 is maintained within predetermined limits. Clock pulses from a clock pulse source 5 are coupled to the binary gain amplifier for purposes described in the aforementioned McCarter patent. Whenever the gain of the amplifier changes in a positive direction, a pulse appears on line 19, and whenever the gain is reduced, a pulse appears on line 17. The clock pulse source 5 may be any suitable source known to the prior art, such as a bistable multivibrator, preferably one having precision components so that the repetition rate of output pulses therefrom is highly stabilized.

Figure 5A:
Figure 5B:
Figure 5C:
Figure 5D:
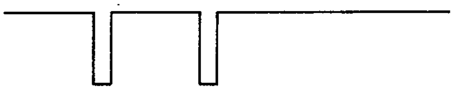
Figure 5E:
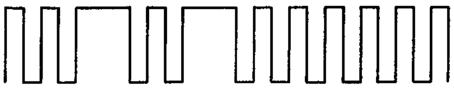
Figure 5F:
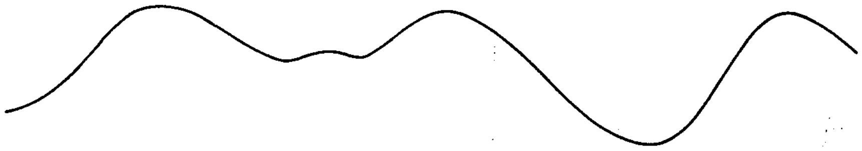
Figure 5G:
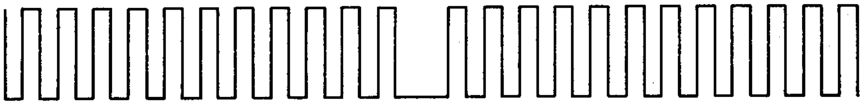
Figure 5H:
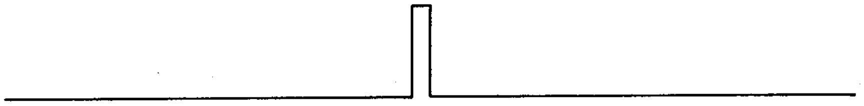

The signals appearing on lines 17 and 19, and the clock signal from clock 5 appearing on line 11 are concomitantly applied to a cycle removing circuit 14, the function of which is to change a characteristic of the output signal from clock 5 whenever a gain change signal appears on line 17 or on line 19. At this instant, the clock signal is modified so that, upon passing through gate 16, it does not go positive for one cycle responsive to a signal appearing on line 17, and it is prevented from going negative on one cycle by a signal appearing on line 19. The clock signal appearing on line 11 is concomitantly applied to AND circuits 13 and 15, and to gate 16. Signals appearing on line 19 are also applied to the input of AND circuit 13, while signals appearing on line 17 are applied to the input of AND circuit 15. Thus, the clock signal from clock 11 appears at the output of AND circuit 13 on line 13A only when a signal concomitantly is applied to the AND circuit from line 19, and the clock signal appears on line 15A at the output of AND circuit 15 only when a signal concomitantly appears on line 17. The operation of the gate circuit 16 will be best understood with reference to the wave forms of FIGS. 5A, 5B, 5C, 5D, and 5E. The wave form of FIG. 5A represents a clock signal such as is produced by clock 5. The wave form of FIG. 5B represents positive pulses such as would be produced on line 19 with each increase in gain of amplifier 3. The wave form of FIG. 5D represents negative going pulses such as would be produced on line 17 with each decrease in gain of amplifier 3. It is to be noted that the pulses on line 19 occur concomitantly with positive going cycles of the clock signal and pulses on line 17 occur concomitantly with negative going half-cycles of the clock signal. Alternatively, if positive going pulses appear on both lines 17 and 19, appropriate phase inverting and time adjusting circuits can be incorporated in lines 17 and 19. This is well within the skill of the art and will not be further discussed herein. Gate 16 may be a type MC359 manufactured by Motorola, Inc. and is adapted to pass the clock signal from clock 5 to amplifier 21 except when a pulse appears on either line 13A or line 15A. Upon the appearance of pulses on either line 13A or line 15A, the output signal from gate 16 will disappear for the duration of such pulse. Thus, the output signal from gate 16 will be a train of clock pulses with a half cycle eliminated therefrom whenever a pulse appears on line 17 or line 19. This can best be seen from the wave forms of FIGS. 5C and 5E. A pulse appearing on line 19, such as is shown in the wave form of FIG. 5B will result in the output signal from gate 16, represented by the wave form of FIG. 5C, having eliminated therefrom positive going half cycles concomitant with the pulses shown in the wave form of FIG. 5B. Likewise, negative going pulses appearing on line 17, as is illustrated in the wave form of FIG. 5D, will eliminate from the output of gate 16 those negative going half cycles concomitant with the pulses appearing on line 17, as is illustrated by the wave form of FIG. 5E.

The clock signal from gate 16, modified as above, is applied to an amplifier 21, and the output from amplifier 21 is applied to a modulating circuit 24, which preferably is of the type illustrated and described in Fairchild Semiconductor Linear Integrated Circuits Applications Handbook, Pages 154 and 155, Library of Congress Catalog Number 67-27446. The function of circuit 24 is to modulate the amplitude of the modified clock signal in accordance with variations in amplitude of the output signal from binary gain amplifier 3 appearing on line 18. The signal appearing on line 23 is applied to a phase splitter that includes transistor 26. The signal appearing at the emitter of transistor 26 is 180° out of phase with the signal appearing at the collector thereof. The signal appearing at the collector is applied to the transistor switch 33B and the signal appearing at the emitter is applied to transistor switch 27B. A potentiometer 22D is connected across the diodes 22B and 22C, the tap of the potentiometer being connected to the emitters of transistors 33B and 27B through resistors 33A and 27A, respectively. The emitters of transistors 33B and 27B are also connected to the input circuits of a differential amplifier 41 through resistors 31 and 29, respectively. Line 18 is connected to the tap of potentiometer 22D through resistor 20, so that the voltage appearing at the tap of potentiometer 22D, and thus the effective voltage applied to the differential input of amplifier 41 through resistors 27A and 29 and 33A and 31 is equal to the sum of the regulated voltage at the tap and the seismic signal from line 18.

Figure 5I:
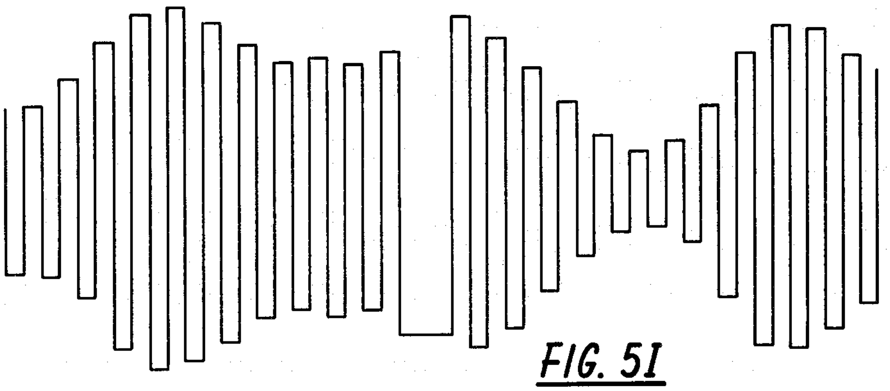

The operation of the modulator 24 is as follows. Assuming that no signal appears on line 18, the square-wave train appearing at line 23 will produce two signals in phase opposition at the outputs of transistor amplifier 26. The signals are applied to the input circuit of differential amplifier 41 through transistor switches 33B and 27B. The signal appearing at the output of differential amplifier 41 will be a replica of the signal applied to transistor 26 from line 23. When a seismic signal appears on line 18, the resulting variation in the potential at the tap of potentiometer 22D will produce a corresponding variation in the amplitude of the square-wave signals at the output of the transistor amplifiers including transistors switches 33B and 27B and thus of the output signal from the differential amplifier 41. The effect will be that the signal appearing on line 43 will be amplitude modulated in accordance with the seismic signal appearing on line 18, as illustrated in FIG. 5I.

Figure 5J:
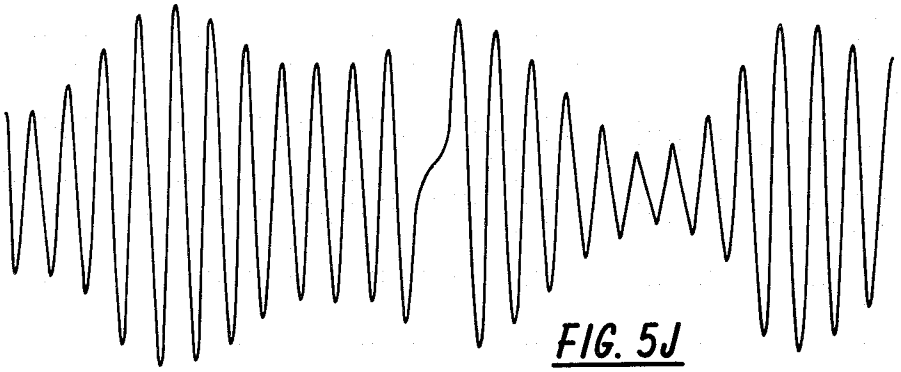

Referring now to FIG. 2, there is illustrated the equipment that would be at the remote location for receiving the signal transmitted from radio transmitter 45. The signals from radio transmitter 45 are detected by the radio receiver 49 and a wave train, such as is represented by the wave form of FIG. 5J, is produced at the output of the radio receiver. This wave train is not an exact duplicate of the square-wave signal applied to the modulator of radio transmitter 45 because of the inherent band pass limitations of the radio transmitter and receiver. Typically, the frequency of clock signals from clock 5 would be about 2,000 Hz. Radio receivers used in communications service normally have a pass band from about 300 Hz to about 3,000 Hz. Therefore, the signal from radio receiver 49 will be rounded off as shown by the wave form of FIG. 5J. This signal, appearing on line 51, is applied to isolating amplifiers 50 and 53. The output signal from amplifier 50, appearing on line 64, is applied to a sample-and-hold circuit 59, the function of which is to sample the incoming signal from amplifier 50 responsive to pulses appearing on line 63 so as to produce a stepped wave form which can be filtered to eliminate the high frequency components thereof and produce an output signal substantially the same as the output signal from binary gain amplifier 3. The output signal from the sample-and-hold circuit 59 is applied through line 65 to an isolating amplifier 61 and then to a low pass filter circuit 66 so that the output signal therefrom appearing on line 66A and amplified by isolating amplifier 67 will be the substantial equivalent of the output signal of the binary gain amplifier 3, as indicated above. The signal is applied through line 73 to a recorder 94.

As indicated above, the output signal from radio receiver 49 also is applied to amplifier 53. The circuit between amplifier 53 and recorder 94 is for the purpose of producing timing pulses indicative of the clock signals from clock 5 for actuating the sample-and-hold circuit through line 63, and for recovering the gain information in the pulse train so as to produce an output signal indicative of the instant at which gain changed in the binary gain amplifier and the sense of each gain change. For this purpose the output signal of amplifier 53 is applied through line 54 to a positive Schmitt circuit 75 (i.e., a Schmitt circuit responsive to positive polarity signals) and to a negative Schmitt circuit 77 (i.e., a Schmitt circuit responsive to negative polarity signals). As is well known, the function of a Schmitt circuit is to produce an output signal when the input voltage thereto is of a given polarity and exceeds a predetermined level. The negative Schmitt circuit 77 produces an output signal on line 78 which is amplified by isolating amplifier 69, subjected to a delay by a one shot-multivibrator delay circuit 70, so that the pulses therefrom are in exact time coincidence with the pulses applied to the sample-and-hold circuit 59 through line 64. The one shot per delay activates a one-shot multivibrator 71 and synchronizes the one-shot multivibrator, the function of which is to apply sampling pulses to line 63.

Figure 5K:
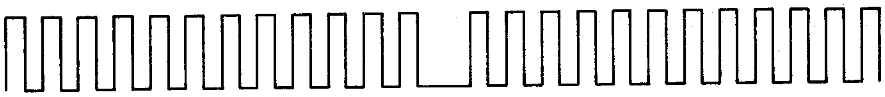
Figure 5L:
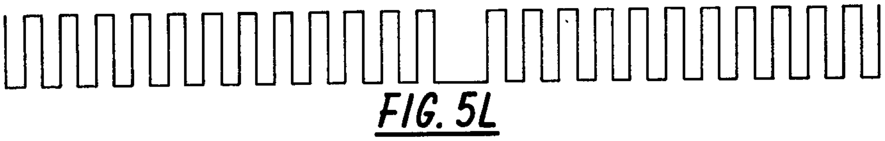
Figure 5M:
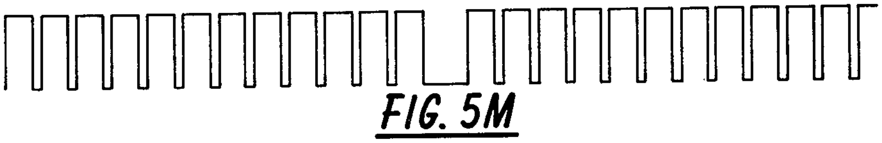
Figure 5N:
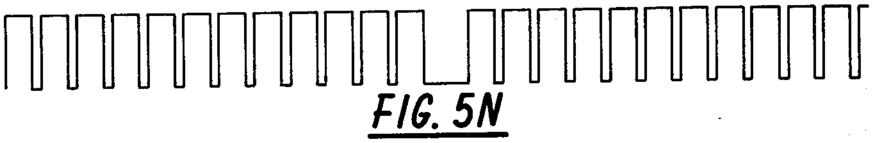
Figure 5O:
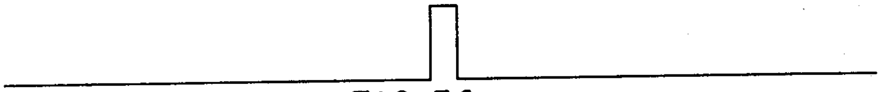

As mentioned before, the positive Schmitt circuit 75 and the negative Schmitt circuit 77 are activated by signals on line 54 as are shown by the wave form of FIG. 5J. The output pulses from the two Schmitt circuits will be 180° out of phase since they are sequentially activated, Schmitt circuit 75 being activated by positive going signals and Schmitt circuit 77 being activated by negative going signals. The output train from Schmitt circuit 75 will be shown by the wave form of FIG. 5K, and the output pulses on line 74 from Schmitt circuit 77 will be shown by the wave form of FIG. 5L. The signals on lines 76 and 74 are respectively applied to one-shot multivibrators 79 and 80 to produce the wave forms of FIGS. 5M and 5N, respectively. The effect of the one-shot multivibrators is to produce pulses of the same polarity respectively responsive to a positive signal from Schmitt circuit 75 and a negative signal from Schmitt circuit 77. The wave form is such that the positive going portions are of substantially greater time duration than the negative going portions so that one or the other of the one-shot multivibrators will always be producing a positive going pulse assuming that there is no gain change in the amplifier 3. The output signals of one-shot 79 and one-shot 80 are both applied to a flip-flop 81, and also are both applied to a gain code gating circuit 82. Flip-flip 81 has two output lines 85 and 86, the pulses on which are of mutually opposite polarity. Line 85 is applied to gate circuit 88 and line 86 is applied to gate circuit 91. Gain code gate circuit 82 also has two output lines therefrom, 87 and 82A. Line 87 is applied to gate circuit 88 and line 82A is connected to gate circuit 91. Flip-flop 81 is triggered back and forth between conduction states by pulses appearing alternately on lines 83 and 84. When consecutive pulses are received by flip-flop 81 from either of lines 83 or 84, however, the flip-flop will remain in its conduction state. Thus, the flip-flop 81 functions to produce a signal on line 85 the level of which will be indicative of which of lines 83 and 84 apply the last pulse to the flip-flop 81. The gain code gate 82 functions to produce an output pulse whenever the level of the signals on lines 83 and 84 are the same. Thus an output signal will appear between lines 87 and 82A when neither of one-shots 79 and 80 produce an output pulse. In effect, gain code circuit 82 is a NOR circuit. The output pulse from gain code circuit 82 is applied to gates 88 and 91 and will pass through gate 88 if the output signal from flip-flop 81 is above the level indicative of the fact that it received its last signal from one-shot 79. The output pulse from gain code gate 82 will pass through gate 91 if the output level of flip-flop 81 is indicative that the last pulse received by the flip-flop was from one-shot 80. The output pulses from the gates 88 and 91 are recorded on separate channels of recorder 94. Furthermore, output pulses of opposite polarity to those on line 90 are produced also by gate 91 and applied to mixer 92. The signals from gate 88 are also applied to mixer 92 so as to produce output signals which are of one polarity indicative of pulses received from gate 88 and are of the opposite polarity when pulses are received from gate 91. These pulses of opposite polarity are also recorded on a separate channel of recorder 94.

The overall operation of the gain decoder will be best understood by reference to the wave forms of FIG. 5J through FIG. 5–0. Let it be assumed that FIG. 5J illustrates the signal produced by radio receiver 49 on line 51, that the wave forms of FIG. 5K and FIG. 5L will be produced by signals on line 76 and 74 respectively, and that the wave forms of FIG. 5M and FIG. 5N will be produced by one-shots 79 and 80 respectively. Since these wave forms are initially such that one or the other is of positive polarity no signals will be produced by either of gates 88 and 91. However, when there is a gap in the train of pulses such as will be produced by a change in gain in the amplifier 3 the gain code gate 82 produces an output pulse as indicated by the wave form of FIG. 5–0. Since one-shot 80 was the last to produce an output pulse the pulse produced by gain code gate 82 will pass through gate 91 to produce a pulse on line 90 indicative of a decrease in gain of the binary gain amplifier. This signal, since it is recorded concomitantly with the signal on line 73, results in a recordation not only of the change in amplitude of the signal applied to amplifier 3 but also its absolute amplitude since gain information is now available.

Figure 3:
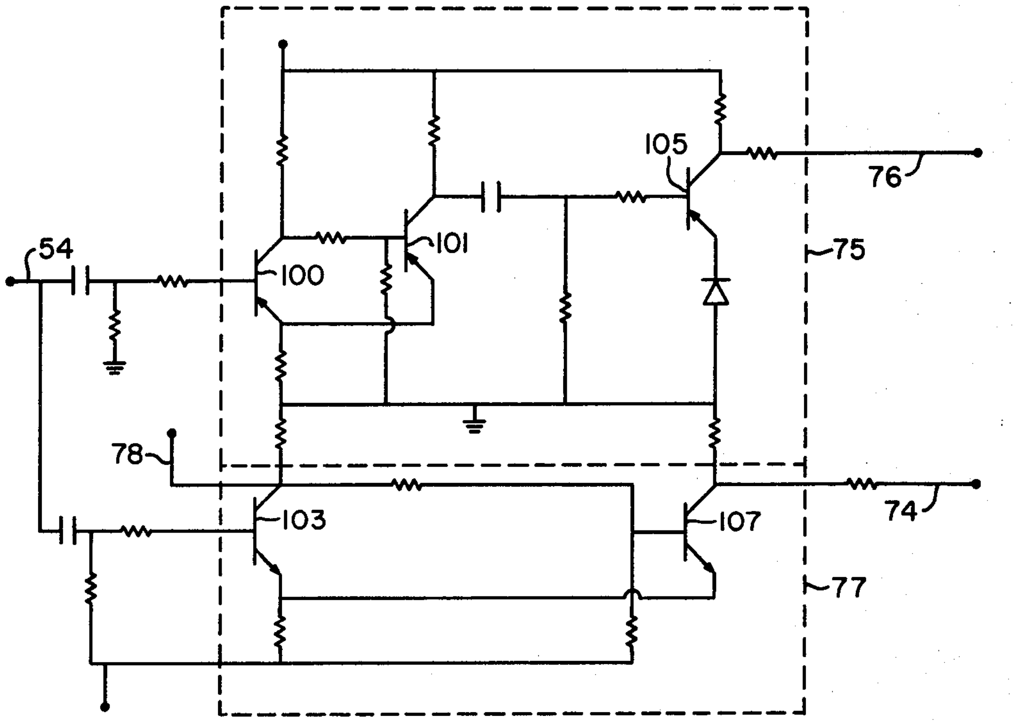
FIG. 3 is a detailed schematic electrical diagram of the apparatus of FIG. 2 designated by the reference numerals 75, 77, 79, and 80.

With reference now to FIG. 3 there is illustrated a schematic electrical diagram showing in detail the circuit of the positive Schmitt circuit 75, the negative Schmitt circuit 77 and the manner in which the signal on line 78 is derived therefrom. Circuit 75 includes transistors 100 and 101 arranged in a conventional Schmitt circuit. Likewise, the negative Schmitt circuit comprises transistors 103 and 107 likewise arranged in a conventional Schmitt circuit with the difference that, while transistors 100 and 101 are PNP transistors, transistors 103 and 107 are of the NPN type. A polarity reversing amplifier 105 is connected to the output of transistor 101 so that the pulses on lines 74 and 76 are of the same polarity. The pulses on line 78 for the sample timing circuit are derived from the collector of transistor 103.

Figure 4:
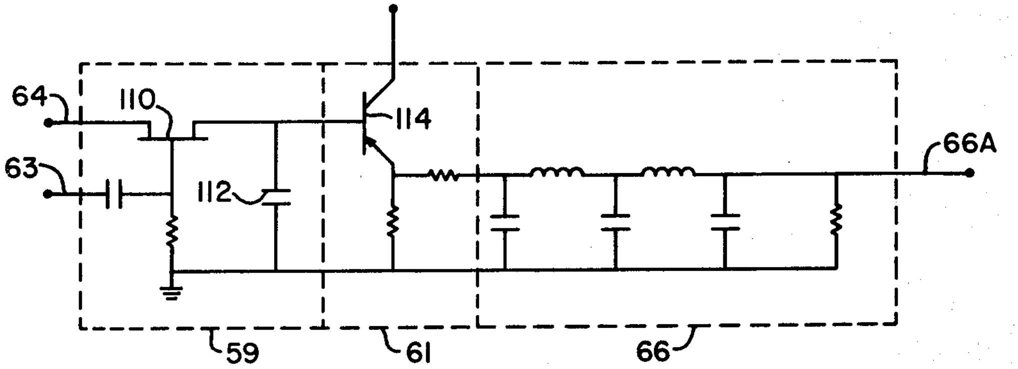
FIG. 4 is a detailed schematic electrical diagram of the apparatus of FIG. 2 designated by the reference numerals 59, 61, and 66.

In FIG. 4 there is shown a detail schematic electrical diagram of the sample-and-hold circuit 59. Line 64 is connected to the source electrode of a field effect transistor 110. The gate electrode is coupled to line 63 through a coupling capacitor and to ground through a resistor. The drain electrode of the field effect transistor 110 is connected to the base of a conventional PNP transistor 114. A high quality storage capacitor 112 is coupled between the drain electrode and ground. The field effect transistor 110 acts as a gate such that, responsive to a pulse on line 63, capacitor 112 will immediately charge to the level of the voltage appearing on line 64. Sample-and-hold circuits of this type are well known to the art and will not be further discussed herein. Transistor 114 acts simply as an isolating amplifier. The stepped wave form voltage produced by the sample-and-hold circuit is coupled by the amplifier 114 to a conventional $\pi$ filter 66, the values of the capacitors and inductors of which are chosen to eliminate frequencies greater than seismic frequencies from the signal appearing on line 66A.

What is claimed:

1. A method of transmitting over a communications link the output data signal of a variable gain amplifier having a plurality of discrete gain steps and adapted to automatically change gain when the output of the output data signal thereof varies outside of predetermined limits, and to produce an output indication indicative of each gain change, comprising:
   - producing an electrical clock signal;
   - eliminating one half cycle of said clock signal upon each change in gain of said amplifier;
   - modulating the amplitude of said clock signal in accordance with variations in amplitude of said data signal;
   - transmitting the modulated clock signal from one terminal to the other of a radio frequency communications link;
   - at said other terminal of said communications link, detecting missing half cycles of said modulated clock signal and producing first electrical signals indicative of the time relationship thereof;
   - at said other terminal of said communications link, demodulating said modulated clock signal to produce a second electrical signal indicative of the amplitude thereof; and
   - concomitantly producing records of the first and second electrical signals.

2. The method of claim 1, wherein
   a. upon an increase in gain of the amplifier, a positive half cycle of the clock signal of one polarity is eliminated therefrom;
   b. upon a decrease in gain of the amplifier, a negative half cycle of the clock signal of the opposite polarity is eliminated therefrom;
   c. at said other terminal of the communications link, the first electrical signal is produced of one polarity when the absence of a positive half cycle of the clock signal is detected, and the first electrical signal is produced of the opposite polarity when the absence of a negative half cycle of the clock signal is detected.

* * * * *